March 29, 1927.
W. G. McBURNEY
1,622,658
BOTTLE STOPPER
Filed Dec. 16, 1925
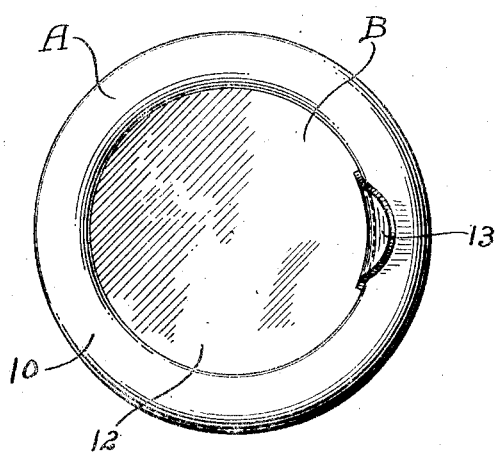
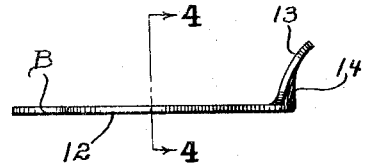
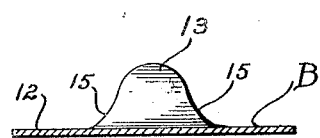
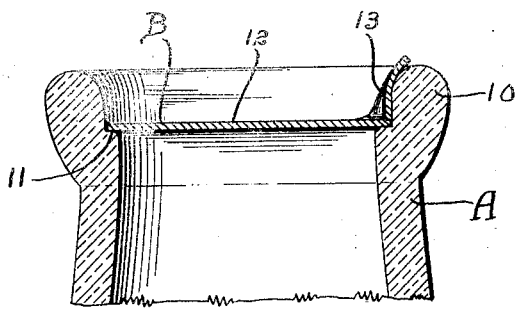
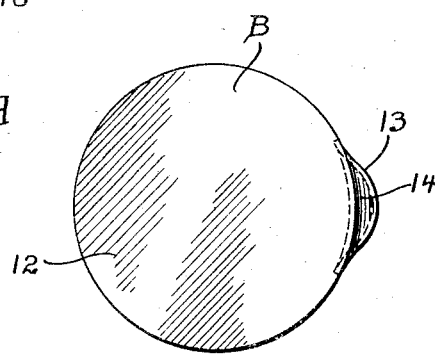
Inventor
Wilbur G. McBurney
By Lamaster and Aldous
Attorneys Patented Mar. 29, 1927.

1,622,658

UNITED STATES PATENT OFFICE.

WILBUR G. McBURNEY, OF ALTOONA, PENNSYLVANIA.

BOTTLE STOPPER.

Application filed December 16, 1925. Serial No. 75,815.

The present invention relates to bottle stoppers, and more specifically to an improved closure for milk bottles.

The primary object of the invention is to provide an improved stopper for milk bottles embodying features whereby the stopper may be readily removed from the bottle without the necessity of employing a pointed instrument for removing the stopper from the bottle.

A further object of the invention is to provide an improved stopper for milk bottles which may be easily removed from the bottle, and which stopper owing to the fact that the same is not mutilated in any way when being removed, may be inserted into the mouth of the bottle after a portion of the milk has been removed therefrom for again forming an effective closure for the bottle.

A still further object of the invention is to provide an improved stopper which may be formed in a single stamping operation, and which stopper when applied to the bottle will not in any way interfere with the handling of the bottle.

A still further object of the invention is to provide an improved stopper having an upwardly struck handle or tab formed thereon wholly inwardly of the contacting circumferential edge of the body portion of the stopper, and which handle or tab has a flaring contour at its base for providing a substantial joint between the tab and body portion of the stopper for preventing pulling off of the tab when grasped to remove the stopper from a bottle.

Other objects and advantages of the invention will be apparent during the course of the following detail description, taken in connection with the accompanying drawing forming a part of this specification and in which drawing:

Figure 1 is a top plan view of a conventional type of milk bottle and showing the improved stopper in position for closing the same.

Figure 2 is a fragmentary transverse section through the upper portion of a milk bottle and showing the stopper in central transverse section.

Figure 3 is a side or edge view of the improved stopper.

Figure 4 is a transverse section on line 4—4 of Figure 3; and,

Figure 5 is a bottom plan view of the stopper.

Referring to the drawing in detail, and wherein similar reference characters designate corresponding parts throughout the several views, the letter A may designate a milk bottle of the conventional type, and B the improved stopper.

The bottle A is formed with the usual rim 10 the inner curved wall of which terminates in an annular shoulder 11 upon which the stopper B rests as in the usual construction of milk bottles wherein a disc shaped cap is employed for closure of the bottle.

The improved stopper B which may be formed of suitable heavy cardboard and treated in any desired manner for water proofing of the same, embodies a disc shaped main body portion 12 and an integrally formed handle or tab 13. The tab 13 which is of the same material and of the same thickness as the body portion 12, is struck upwardly from the body 12 during the manufacturing process of the stopper, and has its outer face 14, at the base thereof, lying wholly within the circumferential face of the disc shaped body 12. By so having the tab 13 project upwardly from the upper face of the body 12 from a point wholly within the circumferential face of the body, it will be seen that the tab will not interfere with the placing of the stopper or result in any possible leakage, owing to the fact that with such construction the base of the outer face 14 forms an unbroken continuation of the circumferential face of the body 12. The tab 13 is also concaved both vertically and transversely so that when the cap is inserted into the mouth of the milk bottle A, the tab will lie in snug fitting contact with the inner face of the rim 10 in a manner to prevent the accumulation of any foreign matter between the tab and the rim. Such curving of the tab also provides a substantial pocket at the inner side of the tab and the outer curved face 14 provides a substantial hook for permitting of a firm grip being had upon the tab when grasping the same for removing the stopper from the bottle.

By so having the tab concaved both vertically and transversely, it will be seen that should it be desirable to again place the stopper in the bottle, the tab will readily conform to the inner contour of the rim 10. It is essential that the tab conform to the contour of the rim 10, since upon removal of the stopper from the bottle, the tab side of the disc will be drawn upwardly first, and were the tab 13 not in contact with the rim 10 the matter which may have accumulated between the tab and rim would be liable to fall into the bottle. The side edges of the tab merge into the upper face of the body 12 in arcs or fillets as at 15, and which flaring of the base of the tab forms a substantial connection between the tab and body for preventing any possibility of the tab being torn from the body when grasped to remove the stopper from the bottle. By so having the edges of the tab merged into the upper face of the body 12 in arcs as shown, a much stronger construction is provided than would be had should the side edges of the tab meet in abrupt angles with the body 12.

From the foregoing description it will be seen that an extremely simple and efficient closure has been provided for milk bottles, embodying features whereby the stopper may be readily removed without the necessity of employing a device which would be liable to puncture the cap and prevent further use thereof for effectively closing the bottle. It will also be apparent that owing to the fact that the tab projects upwardly from the base of the disc 12 from a point wholly within the circumferential edge of the disc, that the tab will not interfere with the placing of the cap nor result in possible leakage past the disc at the tab.

Various changes may be made to the form of invention herein shown and described, without departing from the spirit of the invention or the scope of the following claims.

I claim:

1. A bottle stopper comprising a disc shaped body provided with an integrally formed upwardly struck tab having the base of the outer face thereof conforming to the circumferential edge of the body portion and having the side edges of the tab merging in fillets into the upper face of the body portion wholly within the circumferential edge of the disc.

2. A bottle stopper comprising a disc shaped body portion having an integrally formed upwardly bent tab, said tab being concaved both vertically and transversely and having the base of its outer wall conforming to the curvature of the circumferential edge of the disc shaped body portion.

3. A bottle stopper comprising a disc shaped body portion and an integrally formed tab, said tab being arcuated both vertically and transversely to provide a concavity and convexity at both of its faces and having its base merging into the face of the body portion wholly inwardly of the circumferential head of the body portion.

WILBUR G. McBURNEY.